June 27, 1950 — O. HILL — 2,512,861
BASKET FOR CHICKEN NESTS
Filed March 3, 1947

INVENTOR
Otto Hill
BY Emery Varney,
Whittemore & Dix
ATTORNEYS

Patented June 27, 1950

2,512,861

UNITED STATES PATENT OFFICE 2,512,861

BASKET FOR CHICKEN NESTS

Otto Hill, Margaretville, N. Y.

Application March 3, 1947, Serial No. 731,989

6 Claims. (Cl. 119—48)

This invention relates to nests for chickens.

It is an object of the invention to provide an improved chicken nest that keeps the eggs clean, protects them from breakage, permits immediate cooling of newly laid eggs, and encourages laying. Other features of the invention relate to a construction that facilitates cleaning of the nest and that adapts the invention to use with existing nests regardless of minor variations in the sizes of the nests.

The commonly used chicken nest is a cubicle approximately 11 inches by 13 inches with a closed back and an opening in the front large enough for a chicken to enter easily. Such nests are commonly built in rows and the rows are located one above another with roosts or platforms in front of each row to permit the chickens to reach the individual nests. One popular style of nest is made of sheet metal that has a number of nests built into an integral unit.

Some chicken raisers use battery systems of nests in which each hen is enclosed in a nest or cage having a sloping wire bottom that permits the eggs to roll out of the enclosure. Such battery systems have provision for keeping them clean, but these systems are costly and the expense of a separate cage nest for every hen in the flock is a prohibitive investment for the average poultry farm.

Another object of this invention is to provide a basket structure that is combined in a conventional chicken nest in such a way as to give the nest the same advantages in cleanliness and egg protection that are obtained with trap nests. This invention is used with nests into which hens go directly from the chicken yard with dirt and litter on their feet and the invention keeps the eggs clean by providing a wire mesh nest bottom through which dirt and litter can fall, and by having a slope to the nest bottom which causes each egg to roll out of the nest into a protected location where it cannot be stepped on by other hens going into the nest.

Eggs must be cleaned without washing them, and with a flock of a thousand hens, from three to ten hours per day are sometimes required to clean eggs, depending upon conditions of litter in the chicken yard or house, which in turn is influenced by temperature, there being more litter tracked into the nests in winter weather and also when the ground and litter are soft and wet.

It is a feature of the invention that the nest bottom is comfortable and not slippery; and this makes the hens feel safe. Actual experience has shown that they lay better in nests equipped with this invention. Experience with the invention has shown also that the removal of eggs from the nest reduces brooding 75%. There are no eggs remaining in the nest to arouse the brooding instinct.

Other objects, features and advantages of the invention will appear or be pointed out as the description proceeds.

In the drawing, forming a part hereof, in which like reference characters indicate corresponding parts in all the views.

Figures 1, 2:
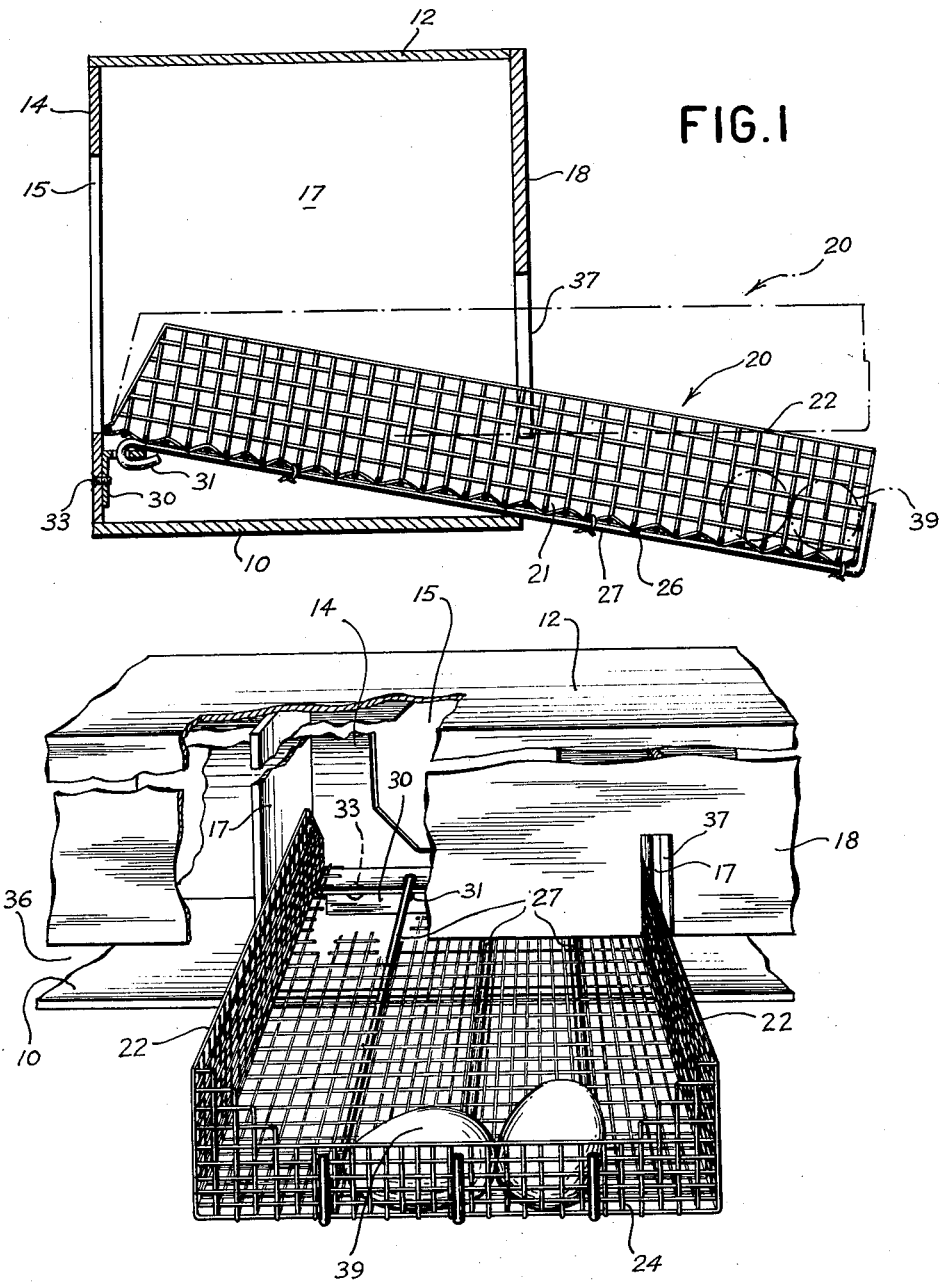
Figure 1 is a sectional view showing a chicken nest embodying this invention.
Figure 2 is a rear view, in perspective, of the nest shown in Fig. 1, part of the structure being broken away and part of it being shown in section.

Fig. 1 shows a chicken nest having a solid bottom 10, and a top 12. The nest has a front wall 14 with an opening 15 large enough for a hen to enter the nest. The lower end of the opening 15 is at a substantial distance above the solid bottom 10 in accordance with conventional nest construction.

The nest is closed on the far side by a side wall 17, and is closed on the near side, ahead of the plane of section, by a similar side wall. The distance between the side walls is approximately 11 inches in commercial nests and the distance from the inside of the front wall 14 to the inside of the back wall 11 is approximately 13 inches. Commercial nests of this style are commonly made of sheet metal, but the thickness of the material of the bottom 10, and the other parts of the nest is exaggerated in the drawing for clearer illustration. The back of the nest is partially closed by a back wall 18, preferably made of wood.

A basket structure 20, preferably made of hardware cloth, includes a wire mesh bottom 21 and side walls 22 which, in the construction illustrated, are turned up edges of the same piece of hardware cloth from which the bottom 21 is constructed. The basket structure 20 has a rearward end 24, preferably a turned up edge of the hardware cloth bottom 21, and this basket structure is made without any forward end wall, that is, the space between forward ends of the sides 22 is unobstructed.

The bottom 21 is of one-half inch mesh and gage 19 wire so that the bottom will be slightly resilient. Since this grade of hardward cloth would bend substantially under the weight of a hen in the nest, and would acquire a permanent sag, stiffening elements 26 are placed under the wire mesh bottom 21, and these stiffening elements are attached to the hardware cloth by tack welding or by tying the hardware cloth to the stiffening elements at spaced regions by tie wires 27. In the preferred construction there are three stiffening elements 26 extending for the full length of the bottom 21 and extending substantially parallel to the sides 22 at regions approximately one quarter and one half way across the bottom of the basket structure 20.

These stiffening elements 26 localize the bending of the wire mesh bottom 21, but permit some bending so that the basket structure feels soft to the hen walking around in the nest. The one-half inch mesh wire is small enough so that there is no danger that a chicken's foot will get caught; and yet this mesh of hardware cloth provides a rough bottom on which there is no danger of slipping. This feature makes the hen feel safe and promotes better laying.

The forward ends of the stiffening elements 26 are bent downward through holes in a transversely extending leg of an angle 30, and the ends of the stiffening elements 26 are looped around under the leg of the angle to form hooks 31 that prevent the stiffening elements 26 from becoming disconnected from the angle 30 but at the same time form a hinge connection between the basket structure 20 and the angle 30. The downwardly extending leg of the angle 30 bears against the inside surface of the front wall 14 and is secured to the front wall by bolts or screws 33.

The angle 30 supports the forward end of the basket structure 20 at an elevation above the solid bottom 10 and substantially flush with the bottom of the opening 15 through which the hen enters the nest. The basket structure 20 is substantially longer than the nest and rests on the rearward edge of the solid bottom, as shown in Fig. 1. In practice it has been found that a length of 24 inches for the basket structure 20 is a practical size for use with a standard nest having a depth of about 13 inches. The elevation of the forward end of the nest is of the order of 2½ inches. This gives the bottom enough slope to insure rolling out of the eggs, but does not cause the eggs to roll so fast as to break.

There is an opening 36 between the back wall 18 and the solid bottom 10 and there are slots 37 extending upward from the opening 36 in position to receive the sides 22 of the basket structure. This opening 36 and the slots 37 permit the basket structure 20 to be raised into the dotted line position indicated in Fig. 1 so that a tool can be inserted into the space between the solid bottom 10 and the raised bottom of the basket structure 20 for removing dirt and litter that drops through the wire mesh bottom 21.

Eggs laid in the nest on the sloping wire mesh bottom 21 roll through the opening 36 under the back wall 18 and into the part of the basket structure 20 which extends beyond the back of the nest. Two eggs 39 are shown in Fig. 1. By removing the eggs from the nest immediately after they are laid, rapid cooling of eggs is assured and this makes the eggs have better flavor and stay fresh from three to four weeks longer.

The portion of the basket structure 20 which extends beyond the end of the nest is large enough to accommodate a substantial number of eggs so that even during peak laying periods it is not necessary to gather the eggs more than once a day. In nests that are used by a number of hens, and that have no provision for removing eggs, it is necessary to collect eggs frequently in order to avoid the danger of having some of the eggs broken when there are a number located in one nest. The back 18 shuts off the view of the eggs from a hen in the nest. It is not possible for a hen to pick at the eggs, and even eggs having soft shells are protected against being broken.

The invention eliminates the use of straw in the nest and thus helps to prevent lice. No straw is necessary because the hardware cloth provides a bottom with sufficient yield to prevent danger of breakage of eggs and to provide a comfortable resting place for the hen.

The construction of the basket structure 20 with the sides 22 formed by turning up the edges of the hardware cloth has practical advantages because there are minor size variations in nests of standard design. As will be apparent from Fig. 2, the angle 30 extends across substantially the entire width of the nest but has sufficient clearance at the both ends to provide tolerances for variations in the nest width. The sides 22 are bent upward with a distance between them of approximately ten and one-half inches. This makes the basket fit into a nest that is slightly narrower than the standard, and the sides 22 can be bent outward to fit nests of eleven inches in width or slightly larger. The sides 22 preferably extend upward for about two inches or further so that there is no danger that the hen will put her foot between the mesh sides 22 and the solid sides 17 of the nest even though the sides 22 are not bent into actual contact with the solid walls 17 of the nest.

The forward ends of the sides 22 have a rearward slope when the basket structure 20 is in its normal position, shown in Fig. 1. This slope makes it possible to swing the rearward end of the basket structure upward without having the sides 22 collide with the front wall 14.

This invention provides a practical and economical construction for removing eggs from a nest automatically so that the eggs remain clean and are protected against possible breakage. The preferred construction has been illustrated and described but changes and modifications can be made, and some features can be used in different combinations without departing from the invention as defined in the claims.

I claim as my invention:

1. The combination with a chicken nest having side walls, a back wall, and a front wall in which there is an opening through which a hen may enter the nest, of a nest basket having side walls and a wire mesh bottom, fastening means that hold the basket in the nest with the forward end of the basket adjacent to the front wall of the nest and at a level below the opening through the front wall, said basket extending rearwardly with a downward slope, and having a length substantially greater than the length of the nest so that the rearward end of the sloping bottom is beyond the back wall of the nest, the lower end of the back wall terminating far enough above the bottom of the basket to permit an egg to roll under the back wall and out of the nest along the sloping bottom; and said back wall having narrow openings above the sides of the basket with clearance above the sides to permit raising of the rearward end of the basket.

2. A chicken nest construction comprising a cubicle with a solid bottom, a back wall, and a front wall having an opening spaced above the solid bottom to provide entrance into the nest for a hen, a wire mesh basket having bottom, sides and a back, hinge means connecting the basket to the front wall of the nest with the front edge of the bottom of the basket below the opening through the front wall but at a substantial distance above the solid bottom of the nest, said basket extending rearwardly for a substantial distance beyond the back wall and beyond the solid bottom, and said basket sloping downwardly toward the rear with sufficient incline to cause eggs that are laid in the nest to roll out of the nest and down to the back of the basket, the back wall above the basket extending downward between the sides of the basket but terminating above the bottom of the basket at a distance sufficient to leave clearance for the passage of eggs, and said back wall having narrow openings above the sides of the basket high enough to leave clearance for the basket to be swung about its hinged connection with the front wall and into a raised position that provides access for a cleaning implement into the space between the solid bottom of the nest and the raised bottom of the basket.

3. In a chicken nest including a solid bottom, side walls, a back wall, and a front wall having an opening through which a hen can enter the nest, the combination of a nest basket substantially longer than the nest and having a wire mesh bottom, hinge means connecting the forward end of the wire mesh bottom to the front wall at a region immediately adjacent the lower edge of the opening in the front wall and at a substantial height off the bottom of the nest, the back wall of the nest having an opening through which the nest basket extends, and said opening in the back wall being high enough to leave clearance for the nest basket to be swung upward about its hinge connection with the front wall into a raised position that provides access for a cleaning implement into the space between the wire mesh bottom and the solid bottom of the nest.

4. In a chicken nest including a solid bottom, side walls, a back wall, and a front wall having an opening through which a hen can enter the nest, the combination of a nest basket substantially longer than the nest and extending through an opening in the back wall of the nest, said basket having a wire mesh bottom and means supporting its forward end at a distance from the bottom of the nest, and with the bottom of the nest basket sloping downwardly toward the rear, but the nest basket free to swing about its forward end support to move the entire bottom of the nest basket away from the solid bottom of the nest, the back wall of the nest having an opening through which the nest basket extends, said opening in the back wall being high enough to leave clearance for the nest basket to be moved into a raised position that provides access for a cleaning implement into the space between the bottom of the basket and the solid bottom of the nest.

5. A wire mesh chicken basket comprising a bottom, sides formed from turned-up portions of the bottom, a back similarly formed by a turned-up portion of the bottom, stiffening elements extending lengthwise of the bottom intermediate the sides of the basket and in contact with the wire mesh bottom of the basket for localizing bending of the wire mesh when a hen is in the nest, angle means at the forward end of the nest basket, said angle means being connected with the basket by hinged connections with the forward ends of the stiffening elements, and said angle means having a downwardly extending portion with a face that contacts with the inside surface of a front wall of a nest for connection with the front wall of the nest in which the wire mesh basket is to be used.

6. A chicken nest bottom and support for connection with chicken nests having a bottom and a front wall with an opening through which a hen enters the nest, including in combination, a wire mesh basket made of hardware cloth and having a bottom and upstanding sides formed by bending up the side portions of the bottom, said basket having also a back similarly formed by turning up the rearward edge portion of the bottom, stiffening wires extending lengthwise of the bottom and at least some of which are located between the sides of the basket in position to localize the bending of hardware cloth when a hen is in the nest, an angle section extending across substantially the full width of the front end of the basket, said angle section having a horizontally extending leg with openings therein at spaced regions for receiving downwardly extending front ends of the stiffening elements, and said angle section having a downwardly extending leg with openings therein for receiving fastening members that bolt the angle to the front wall of the chicken nest, the downwardly extending front ends of the stiffening elements being looped around the horizontal leg of the angle section far enough to secure the basket to the angle while leaving the basket free to swing about the angle section as a hinge.

OTTO HILL.

REFERENCES CITED

The following references are of record in the file of this patent:

UNITED STATES PATENTS

| Number | Name | Date |
|---|---|---|
| 1,431,278 | Backlind | Oct. 10, 1922 |
| 1,817,588 | Shaffer | Aug. 4, 1931 |
| 1,911,633 | Lohrer | May 30, 1933 |
| 2,266,685 | Dadlow | Dec. 16, 1941 |

FOREIGN PATENTS

| Number | Country | Date |
|---|---|---|
| 460,455 | Great Britain | Jan. 28, 1937 |